(12) United States Patent
Simmons

(10) Patent No.: US 10,539,164 B2
(45) Date of Patent: Jan. 21, 2020

(54) HYDRAULIC ACUATOR

(71) Applicant: William Davis Simmons, Santa Clara, CA (US)

(72) Inventor: William Davis Simmons, Santa Clara, CA (US)

( * ) Notice: Subject to any disclaimer, the term of this patent is extended or adjusted under 35 U.S.C. 154(b) by 290 days.

(21) Appl. No.: 15/353,732

(22) Filed: Nov. 16, 2016

(65) Prior Publication Data

US 2017/0067493 A1    Mar. 9, 2017

Related U.S. Application Data

(63) Continuation of application No. 14/031,845, filed on Sep. 19, 2013, now Pat. No. 9,528,532.

(60) Provisional application No. 61/706,645, filed on Sep. 27, 2012.

(51) Int. Cl.
| | |
|---|---|
| *F15B 15/28* | (2006.01) |
| *F15B 13/10* | (2006.01) |
| *F15B 7/00* | (2006.01) |
| *F15B 7/08* | (2006.01) |
| *F15B 15/10* | (2006.01) |
| *B25J 9/14* | (2006.01) |
| *F15B 13/16* | (2006.01) |

(52) U.S. Cl.
CPC ........... *F15B 15/2861* (2013.01); *B25J 9/144* (2013.01); *F15B 7/003* (2013.01); *F15B 7/08* (2013.01); *F15B 13/10* (2013.01); *F15B 13/16* (2013.01); *F15B 15/103* (2013.01)

(58) Field of Classification Search
CPC . F15B 7/003; F15B 2013/0448; F15B 15/103

USPC .......................................... 92/90–92; 60/473
See application file for complete search history.

(56) References Cited

U.S. PATENT DOCUMENTS

| | | | | |
|---|---|---|---|---|
| 4,819,547 A | * | 4/1989 | Kukolj | F15B 15/103 |
| | | | | 92/153 |
| 5,089,930 A | * | 2/1992 | Chass | H01F 29/10 |
| | | | | 336/136 |
| 5,166,563 A | * | 11/1992 | Bassine | F04B 35/045 |
| | | | | 128/205.18 |
| 2008/0008609 A1 | * | 1/2008 | Pate | F04C 13/001 |
| | | | | 417/415 |

(Continued)

FOREIGN PATENT DOCUMENTS

EP    0271744 A2 *    6/1988    ............. B64C 13/40

OTHER PUBLICATIONS

Machine Translation of EP0271744.*

*Primary Examiner* — Michael Leslie
*Assistant Examiner* — Daniel S Collins
(74) *Attorney, Agent, or Firm* — Douglas L. Weller

(57) ABSTRACT

A hydraulic actuator includes a hollow tube that has a first opening at a first end of the hollow tube and that has a second opening at a second end of the hollow tube. The hollow tube contains hydraulic fluid. A moveable magnet moves within hollow tube as a result of a magnetic field within the hollow tube. A magnetic field source located outside the hollow tube creates the magnetic field within the hollow tube. When the moveable magnet moves to the first end of the hollow tube, a first piston pushes hydraulic fluid out of the first opening. When the moveable magnet moves to the second end of the hollow tube a second piston pushes hydraulic fluid out of the second opening.

20 Claims, 3 Drawing Sheets

(56) References Cited

U.S. PATENT DOCUMENTS

2011/0203265 A1* 8/2011 Matsumoto ............. F15B 15/18
  60/325
2013/0001242 A1* 1/2013 Hofstetter ............. B01L 3/0217
  222/333

* cited by examiner

HYDRAULIC ACUATOR

BACKGROUND

Hydraulic cylinders are mechanical actuators that get power from pressurized hydraulic fluid. A hydraulic cylinder typically includes a cylinder barrel in which a piston connected to a piston rod moves back and forth. The piston divides the hydraulic cylinder into a first chamber and a second chamber. When the hydraulic pump pushes hydraulic fluid into the first chamber, a valve in the second chamber is open allowing hydraulic fluid to drain from the second chamber into a reservoir as movement of the piston within the hydraulic cylinder increases the volume of the first chamber and correspondingly reduces the volume of the second chamber. Likewise, when the hydraulic pump pushes hydraulic fluid into the second chamber, a valve in the first chamber is open allowing hydraulic fluid to drain from the first chamber into the reservoir as movement of the piston within the hydraulic cylinder increases the volume of the second chamber and correspondingly reduces the volume of the first chamber.

Typically, the hydraulic pump runs at a constant speed to produce hydraulic pressure. If motion is not imminent, the unused pressured hydraulic fluid is returned to the reservoir or stored in an accumulator.

DETAILED DESCRIPTION

Figure 1:
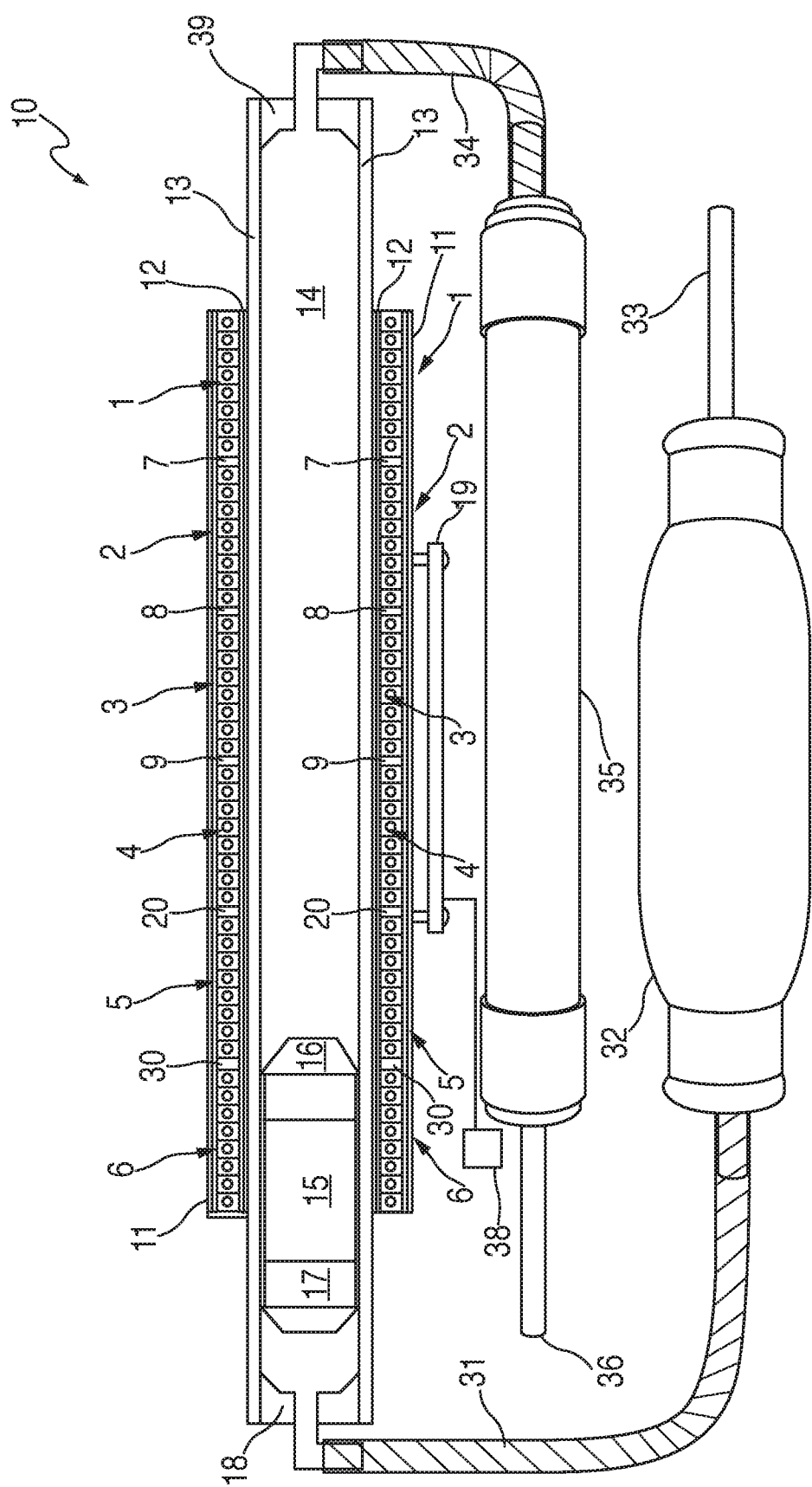
FIG. 1 shows a hydraulic actuator system in accordance with an embodiment.

FIG. 1 shows a hydraulic actuator system. The hydraulic actuator includes a hydraulic actuator 10. A cross section of hydraulic actuator 10 is shown in FIG. 1.

A hollow tube 13 is encased by wire windings, represented in FIG. 1 by wire windings 1, wire windings 2, wire windings 3, wire windings 4, wire windings 5 and wire windings 6. Wire windings 1 are separated from wire winding 2 by a space 7. Wire windings 2 are separated from wire winding 3 by a space 8. Wire windings 3 are separated from wire winding 4 by a space 9. Wire windings 4 are separated from wire winding 5 by a space 20. Wire windings 5 are separated from wire winding 6 by a space 30. While FIG. 1 shows six separate windings—wire windings 1, wire windings 2, wire windings 3, wire windings 4, wire windings 5 and wire windings 6—the number of wire windings is exemplary and can be varied from one to twenty or even more depending on application and implementer preferences.

Activating current through a subset of the wire windings produce a magnetic field within hollow tube 13. A magnet 15 within hollow tube 13 moves as a result of and in response to the magnetic field produced by current through the subset of wire windings. For example, magnet 15 is a rare earth cylindrical magnet. For example, the wire windings are placed over a copper tube 13 and within a ferrous metal tube 11. Ferrous metal tube 11 contains and intensifies the magnetic field produced by placing current through the subset of wire windings.

Current through the wire windings produces a Lorentz force that will result in a motional electromotive force on magnet 15 that moves magnet 15 within hollow tube 13. A piston 17 and a piston 16 isolate magnet 15 from hydraulic fluid 14 within tube 13. An electronic control circuit 19 provides current to the selected subsets of the wire windings to control movement of magnet 15. By controlling amplitude of the current and direction of the current through the windings, electronic control circuit can precisely control position of moving magnet 15 within hollow tube 13. The motional electromotive force placed on magnet 15 varies based on a number of factors such the number of windings in each of the wire windings, the density of windings, the amount of current placed through the selected wire windings, the direction of the current placed through the selected wire windings, the size and shape of magnet 15, the magnetic properties of magnet 15, the proximity of the magnet 15 to the wire windings and so on.

For example, each of wire windings 1, wire windings 2, wire windings 3, wire windings 4, wire windings 5 and wire windings 6 are separately connected to electronic control circuit 19 allowing electronic control circuit 19 to separately control current through each of the wire windings. For example, electronic control circuit 19 can place pulse width current signals with current flowing in opposite directions on each of two adjacent wire windings. The resulting magnetic field will place and hold magnet 15 in a particular location within hollow tube 13 in proximity of the two adjacent wire windings. By independently varying the pulse width duration in each of the two adjacent wire windings electronic control circuit 19 can move magnet 15 in either direction along hollow tube 13.

For example, when magnet 15 is in the proximity of wire windings 3 and wire windings 4, electronic control circuit 19 can control pulse width signals in wire windings 3 and wire windings 4 to move magnet 15 towards wire windings 5. Then electronic control circuit 19 can stop the current in wire windings 3 and can control pulse width signals in wire windings 4 and wire windings 5 to move magnet 15 towards wire windings 6. And so on. For more information on using pulse width current signals through wire windings to create a Lorentz force to precisely move a magnet through magnetic fields, see for example, Bryan Craig Murphy, "Design and Construction of a Precision Tubular Linear Motor and Controller", Submitted to Texas A&M University, May 2003; Tony Morcos, "The Straight Attraction Part 1" Motion Control, June 2000, pp. 29-33; and Tony Morcos, "The Straight Attraction Part 2" Motion Control, July/August 2000, pp. 24-28.

When electronic control circuit 19 applies current through various subsets of the windings to move magnet 15 towards a sealing piston seat 18 at an end of tube 13, hydraulic fluid is forced by piston 17 through a flexible hydraulic fluid transport hose 31 and into a hydraulic muscle 32. Hydraulic muscle 32 contracts as it receives hydraulic fluid. Attachment structure 33 is pulled and can be used to pull a load, such as is necessary when flexing a robot arm. Also, as electronic control circuit 19 moves magnet 15 towards sealing piston seat 18 of tube 13, hydraulic fluid is drawn by piston 16 into tube 13 from a flexible hydraulic fluid transport hose 34 and out of a hydraulic muscle 35. This allows hydraulic muscle 35 to relax and be extended. As can be seen by the above discussion, hollow tube 13 needs to be sufficiently large to provide a volume of hydraulic fluid to hydraulic muscle 32 so that hydraulic muscle 32 can sufficiently contract a desired amount and to provide a volume of hydraulic fluid to hydraulic muscle 35 so that hydraulic muscle 35 can sufficiently contract a desired amount.

A feedback sensor 38, electrically connected to electronic control circuit 19, can be used to monitor extension of attachment structure 36. This can allow electronic control circuit 19 to precisely control movement. While in FIG. 1, feedback sensor 38 is shown positioned to monitor extension of attachment structure 36, feedback sensor 38 can be located at other locations to monitor other phenomena, such as location of attachment structure 33, to provide feedback information to electronic control circuit 19. Also, more than one feedback sensor can be used.

When electronic control circuit 19 applies current through various subsets of the windings to move magnet 15 towards a sealing piston seat 39 at another end of tube 13, hydraulic fluid is forced by piston 16 through a flexible hydraulic fluid transport hose 34 and into a hydraulic muscle 35. Hydraulic muscle 35 contracts as it receives hydraulic fluid. Attachment structure 36 is pulled and can be used to pull a load, such as is necessary when flexing a robot arm. Also, as electronic control circuit 19 moves magnet 15 towards sealing piston seat 39 of tube 13, hydraulic fluid is drawn by piston 17 into tube 13 from a flexible hydraulic fluid transport hose 31 and out of a hydraulic muscle 32. This allows hydraulic muscle 32 to relax and be extended.

The use of motional electromotive force on magnet 15 to pressurize hydraulic fluid makes it easy to allow for compliance to obstructions. That is, when an unexpected obstruction is met during movement, the increased resistance to movement can be detected by the jump in current required to continue the motion. Electronic control circuit 19 can limit the current resulting in stopping the motion of magnet 15 within the magnetic field produced by wire windings 1, wire windings 2, wire windings 3, wire windings 4, wire windings 5 and wire windings 6.

Figure 2:
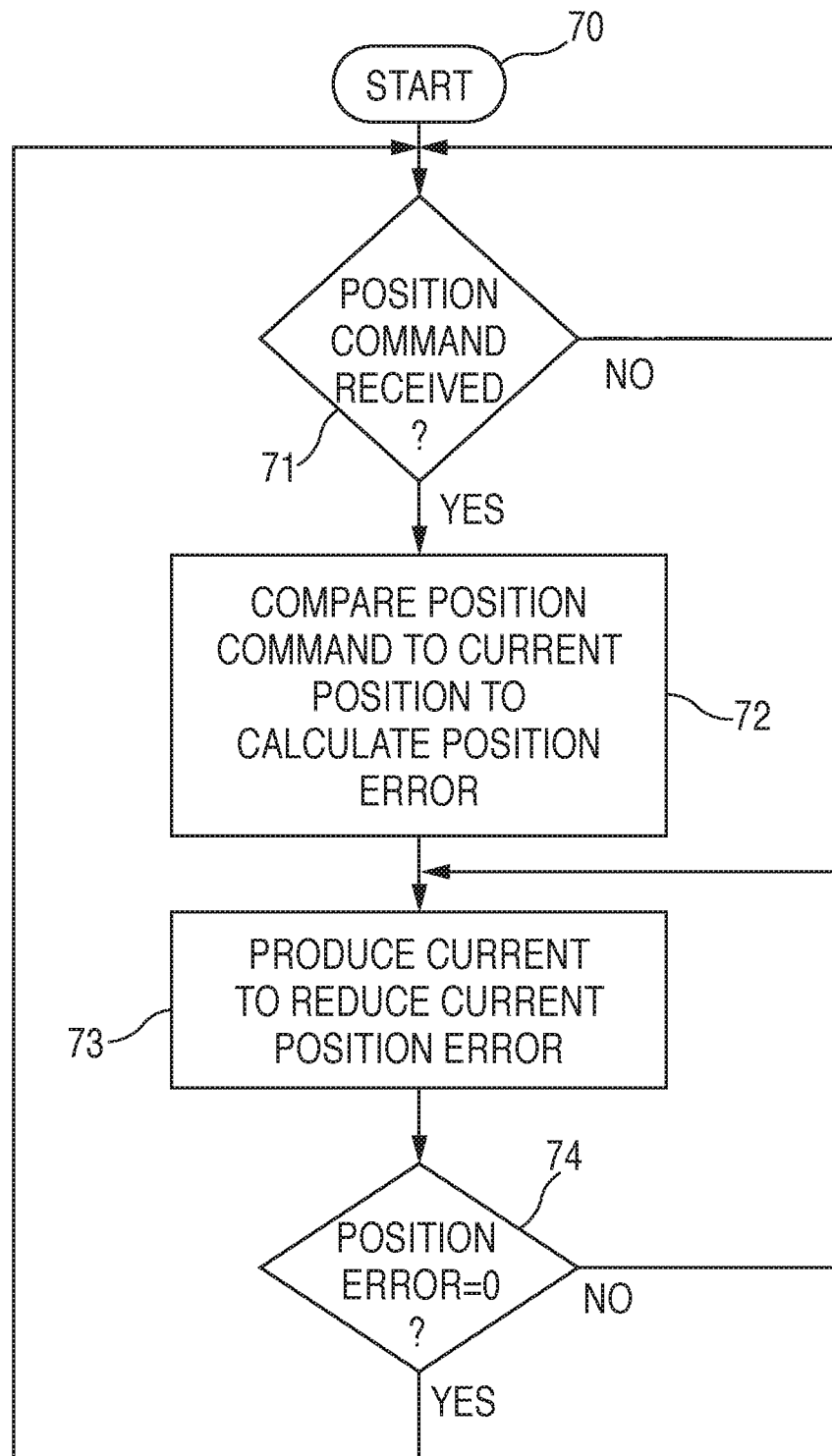
FIG. 2 is a simplified flow chart illustrating operation of an electronic control circuit within the hydraulic actuator system shown in FIG. 1 in accordance with an embodiment.

FIG. 2 is a simplified flow chart illustrating operation of electronic control circuit 19. When operation is started, as illustrated by a block 70, electronic control circuit 19, in a block 71 will wait until a position command is received. For example, a position command is sent by a computer, or some other user device in communication with electronic control circuit 19 and configured to send position commands to electronic control signal 19.

When a position command is received, in a block 72, electronic control circuit 19 will compare a requested position in a position command to a current position reported by feedback sensor 38 to calculate a position error. The position error tells how far and what direction attachment structure 36 needs to move in order to be in the requested position. In a block 73 electronic control circuit 19 will generate current through wire windings 1, wire windings 2, wire windings 3, wire windings 4, wire windings 5 and wire windings 6. that will move magnet 15 in a direction that will cause attachment structure 36 to move closer to the requested position. In a block 74, information from feedback sensor 38 will be monitored until attachment structure 36 is in the requested position.

If it is desired to control speed of motion, commands to electronic control circuit can specify a requested speed of motion (e.g., slow, medium, fast) and electronic control circuit can control current placed through the wire windings to accommodate the requested motion speed.

The hydraulic actuator system shown in FIG. 1 can be attached to a lever on a pivot or rack and pinion gear to produce various movements, such as a limited circular movement. Multiple hydraulic actuator systems can be connected together to produce multiple degrees of freedom, such as in the joints of robot arms or legs.

Figure 3:
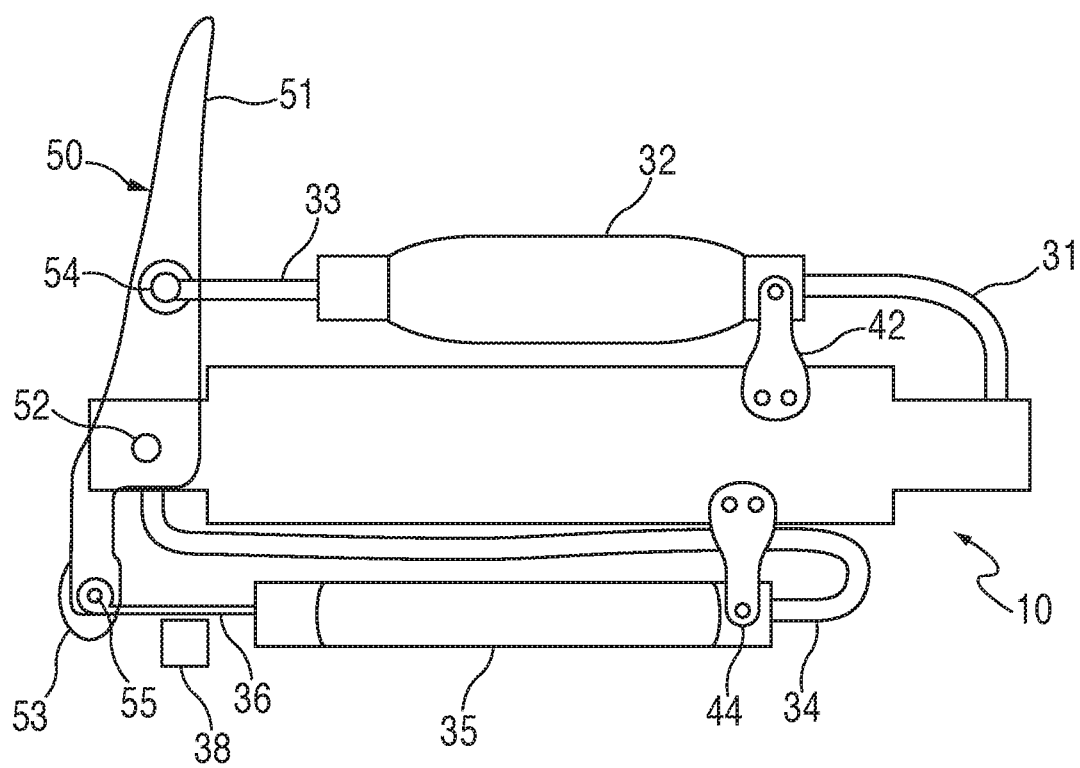
FIG. 3 shows the hydraulic actuator system shown in FIG. 1 integrated as part of a robotic joint in accordance with an embodiment.

For example, FIG. 3 shows the actuator system of FIG. 1 used as part of a movable joint in a robotics system. Hydraulic actuator 10 is connected to a lever 50 at a pivot 52. Hydraulic muscle 32 is anchored to hydraulic actuator 10 by a bracket 42. Hydraulic muscle 35 is anchored to hydraulic actuator 10 by a bracket 44. Attachment structure 33 is anchored at pivot 54 to an arm 51 of lever 50. Attachment structure 36 is anchored at pivot 55 to an extended portion 53 of lever 50. When hydraulic muscle 32 pulls attachment structure 33, robotic arm 51 pulls toward hydraulic muscle 32 and hydraulic actuator 10. When hydraulic muscle 35 pulls attachment structure 36, robotic arm 51 extends away from hydraulic muscle 32 and hydraulic actuator 10. Robotic arm 51 and hydraulic actuator 10 thus together act as a joint in a robotics system.

Figure 4:
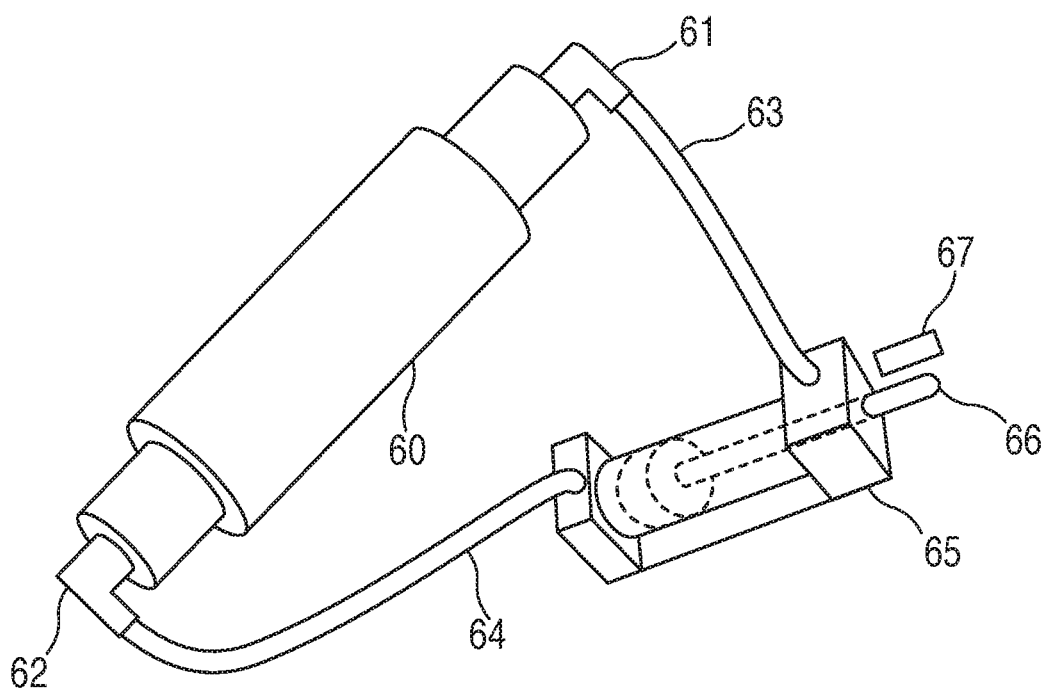
FIG. 4 shows a hydraulic actuator used with a hydraulic cylinder in accordance with an embodiment.

FIG. 4 shows another embodiment where a hydraulic actuator 60 is connected to a hydraulic cylinder 65. When a magnet within hydraulic actuator 60 is moved towards an end 62 of hydraulic actuator 60, hydraulic fluid is pushed through a flexible hydraulic fluid transport hose 64 into hydraulic cylinder 65 to correspondingly extend a piston 66 out of hydraulic cylinder 65. When the magnet within hydraulic actuator 60 is moved towards an end 61 of hydraulic actuator 60, hydraulic fluid is pushed through a flexible hydraulic fluid transport hose 63 into hydraulic cylinder 65 to correspondingly retract piston 66 into hydraulic cylinder 65. A feedback sensor 67 monitors position of piston 66 and communicates position information to an electronic control system of hydraulic actuator 60.

In the above-discussed embodiments, piston 16, piston 17, sealing piston seat 18 and sealing piston seat 39 are constructed for complete seal with no slippage of hydraulic fluid. Alternatively, any or all of piston 16, piston 17, sealing piston seat 18 and sealing piston seat 39 can be constructed to allow some pressurized hydraulic fluid to slip past at a certain predetermined pressure to allow for compliance when obstructions in movement are encountered. If this results in loss of calibration of hydraulic actuator 10 or air in fluid chambers, this can be alleviated by appropriately bleeding the hydraulic system of hydraulic actuator 10.

Also in the above-described embodiments, electronic control system 19 controls movement of magnet 15 in two directions. In an alternative embodiment, the magnet can be spring loaded on one end to so that motion in one direction is achieved by motional electromotive force and motion in the other direction is achieved by force from the spring.

Also in the above-described embodiments, magnet 15 moves while the wire windings are stationary with respect to hollow tube 13. In an alternative embodiment, magnets may be fixed to a hollow tube and be used as a magnetic field source. Within the hollow tube a moveable magnet is an electromagnet that includes wire windings. The electromagnet moves within the hollow tube and as a result of and in response to the magnetic field created by the magnetic field source interacting with the magnet qualities of the moveable magnet produced by the amplitude and current placed through the wire windings.

Also in the above-described embodiments, a hydraulic actuator is shown connected to hydraulic muscles and a hydraulic cylinder. In alternate embodiments, a hydraulic actuator can be connected to other hydraulic devices. For example, hydraulic actuator 10 can be connected to a hydraulic bladder and used to inflate and deflate the hydraulic bladder to alternate a state of the hydraulic bladder between a limp flexible condition and a stiff or rigid condition.

The size of hydraulic actuator 10 can be scaled to be larger or smaller to fit requirements of a particular implementation. Hydraulic actuator 10 can be used in products that need circular hydraulic muscle effects that tighten or loosen around an object, producing a squeezing force. The double action valve function of hydraulic actuator 10 both pressurizes fluid depressurizes fluid depending on a configuration of the hydraulic actuator system. Hydraulic actuator 10 can be used with any product that needs to efficiently and fluidly move a load in a straight line in either direction over a limited distance.

The foregoing discussion discloses and describes merely exemplary methods and implementations. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. A moveable joint of a robotic device comprising:
a first rigid structure;
a second rigid structure connected to the first rigid device at a pivot;
a hydraulic muscle connected to the first rigid structure and to the second rigid structure;
a hollow tube, having a first opening at a first end of the hollow tube and having a second opening at a second end of the hollow tube;
hydraulic fluid within the hollow tube;
a magnet within the hollow tube;
a first piston on a first end of the magnet wherein when the magnet moves toward the first end of the hollow tube the first piston pushes hydraulic fluid out of the first opening;
a second piston on a second end of the magnet wherein when the magnet moves toward the second end of the hollow tube the second piston pushes hydraulic fluid out of the second opening; and
a positioning system that allows precise positioning to place and hold the magnet at any selected location the magnet can reach between the first end of the hollow tube and the second end of the hollow tube, the positioning system including:
a plurality of sets of wire windings around the hollow tube, and
a control circuit that is separately connected to each set of wire windings allowing the control circuit to separately control current through each set of wire windings, the current through each set of wire windings creating a magnetic field that exerts a motional electromotive force on the magnet controlling movement and location of the magnet within the hollow tube so that in response to a positioning command, the control circuit separately controls current through each set of wire windings to hold the magnet at a selected position between the first end of the hollow tube and the second end of the hollow tube;
wherein hydraulic fluid pushed out of the first opening of the hollow tube is pushed into the hydraulic muscle.

2. A moveable joint as in claim 1, wherein the control circuit determines the current to be placed through each set of wire windings by comparing a precise location to current position to calculate a position error, and then places current through each set of wire windings as necessary to reduce the position error.

3. A moveable joint as in claim 2, wherein when the position error is equal to zero, the control circuit maintains the magnet at the precise location.

4. A moveable joint as in claim 1, wherein in response to a command to control speed of motion, the control circuit separately controls amount of the current through each set of wire windings to bring the magnet to the precise location at the speed specified by the command.

5. A moveable joint as in claim 1, wherein the moveable magnet is a rare earth magnet.

6. A moveable joint as in claim 1, wherein the control circuit uses pulse width current signals to create a Lorentz force to precisely move the magnet.

7. A moveable joint as in claim 1:
wherein when the magnet moves to the first end of the hollow tube the second piston draws hydraulic fluid from the second opening into the hollow tube; and,
wherein when the magnet moves to the second end of the hollow tube the first piston draws hydraulic fluid from the first opening into the hollow tube.

8. A moveable joint as in claim 1, additionally comprising:
a copper tube placed over a portion of the hollow tube, the wire winding being located on top of the copper tube.

9. A moveable joint as in claim 1, additionally comprising:
a copper tube placed over a portion of the hollow tube, wherein each set of wire windings is located on top of the copper tube; and,
a ferrous metal tube placed over the plurality of sets of wire windings.

10. A moveable joint comprising:
a first rigid structure;
a second rigid structure connected to the first rigid device at a pivot;
a hydraulic muscle connected to the first rigid structure and to the second rigid structure;
a hollow tube, having a first opening at a first end of the hollow tube and having a second opening at a second end of the hollow tube;
hydraulic fluid within the hollow tube;
a moveable magnet within the hollow tube, the moveable magnet moving within hollow tube as a result of a magnetic field within the hollow tube;
a first piston on a first end of the moveable magnet, wherein when the moveable magnet moves toward the first end of the hollow tube, the first piston pushes hydraulic fluid out of the first opening;
a second piston on a second end of the moveable magnet, wherein the controller controls magnitude and polarity of each magnetic field separately to control location and motion of the moveable magnet with the hollow tube; and,
a controller that precisely controls positioning of the moveable magnet to move and hold the moveable magnet at selected locations between the first end of the hollow tube and the second end of the hollow tube, wherein the precise control of positioning is performed in response to positioning commands, separately controlling magnitude and polarity of each of a plurality of magnetic fields to hold the moveable magnet at a selected location;
wherein hydraulic fluid pushed out of the first opening of the hollow tube is pushed into the hydraulic muscle.

11. A moveable joint as in claim 10, wherein the control circuit compares a selected location to current position to calculate a position error, and then varies magnitude and polarity of at least one of the plurality of magnetic fields as necessary to reduce the position error.

12. A moveable joint as in claim 11, wherein when the position error is equal to zero, the control circuit maintains the magnet at the selected location.

13. A moveable joint as in claim 10, wherein in response to a command to control speed of motion, the control circuit separately controls magnitude of at least one of the plurality of magnetic fields to bring the magnet to the precise location at the speed specified by the command.

14. A moveable joint as in claim 10, wherein each magnetic field is generated with a separate set of wire windings.

15. A moveable joint as in claim 10, additionally comprising:
a feedback sensor that monitors action of a hydraulic device to provide feedback information to the control circuit.

16. A moveable joint as in claim 10, wherein the control circuit uses pulse width current signals to create a Lorentz force to precisely move the magnet.

17. A moveable joint as in claim 10, wherein the moveable magnet includes wire windings.

18. A device comprising:
a hollow tube, having a first opening at a first end of the hollow tube and having a second opening at a second end of the hollow tube;
hydraulic fluid within the hollow tube;
a moveable magnet within the hollow tube, the moveable magnet moving within hollow tube as a result of a magnetic field within the hollow tube;
a first piston on a first end of the moveable magnet, wherein when the moveable magnet moves toward the first end of the hollow tube, the first piston pushes hydraulic fluid out of the first opening;
a second piston on a second end of the moveable magnet, wherein the controller controls magnitude and polarity of each magnetic field separately to control location and motion of the moveable magnet with the hollow tube; and,
a controller that precisely controls positioning of the moveable magnet to move and hold the moveable magnet at selected locations between the first end of the hollow tube and the second end of the hollow tube by, wherein the precise control of positioning is performed by, in response to positioning commands, separately controlling magnitude and polarity of each of a plurality of magnetic fields to hold the moveable magnet at a selected location;
a hydraulic cylinder;
a cylinder piston extending out of the hydraulic cylinder;
wherein hydraulic fluid pushed out of the first opening of the hollow tube is pushed into the hydraulic cylinder to control an amount by which the cylinder piston extends out of the hydraulic cylinder.

19. A device as in claim 18, wherein the control circuit compares a selected location to current position of the cylinder piston to calculate a position error, and then varies magnitude and polarity of at least one of the plurality of magnetic fields as necessary to reduce the position error.

20. A device as in claim 19, wherein when the position error is equal to zero, the control circuit maintains the magnet at the selected location.

* * * * *